United States Patent [19]

Lemke

[11] Patent Number: 4,774,394
[45] Date of Patent: Sep. 27, 1988

[54] LASER WELDING METHOD
[75] Inventor: Timothy A. Lemke, Carlisle, Pa.
[73] Assignee: E. I. Du Pont de Nemours and Company, Wilmington, Del.
[21] Appl. No.: 92,199
[22] Filed: Sep. 2, 1987
[51] Int. Cl.[4] .............................................. B23K 26/00
[52] U.S. Cl. .............................. 215/121.6; 219/121.64
[58] Field of Search ................ 219/121 LC, 121 LD, 219/121 L

[56] References Cited

U.S. PATENT DOCUMENTS

| | | | |
|---|---|---|---|
| 3,524,963 | 8/1970 | Swengel | 219/100 |
| 3,539,762 | 10/1970 | Swengel, Sr. et al. | 219/127 |
| 3,610,874 | 10/1971 | Gagliano | 219/121 LD |
| 3,656,092 | 4/1972 | Swengel, Sr. et al. | 339/213 T |
| 4,230,930 | 10/1980 | Chang et al. | 219/121 LD |
| 4,252,397 | 2/1981 | Eigenbrode | 339/99 R |
| 4,341,942 | 7/1982 | Chaudhari et al. | 219/121 LD |
| 4,507,540 | 3/1985 | Hamasaki | 219/121 LD |

FOREIGN PATENT DOCUMENTS

| | | |
|---|---|---|
| 59-44746 | 3/1984 | Japan . |
| 59-107786 | 6/1984 | Japan . |
| 59-144587 | 8/1984 | Japan . |
| 60-210383 | 10/1985 | Japan . |

*Primary Examiner*—C. L. Albritton

[57] ABSTRACT

A method for welding a metallic conductor wire to a metallic fixture is characterized by introducing the wire into an opening in the fixture such that the axis of the portion of the wire within the fixture extends linearly therethrough and such that the axis of the welding beam extends substantially colinearly to the axis of the portion of the wire within the fixture. The beam of welding energy being targeted on the facial end of the fixture.

9 Claims, 6 Drawing Sheets

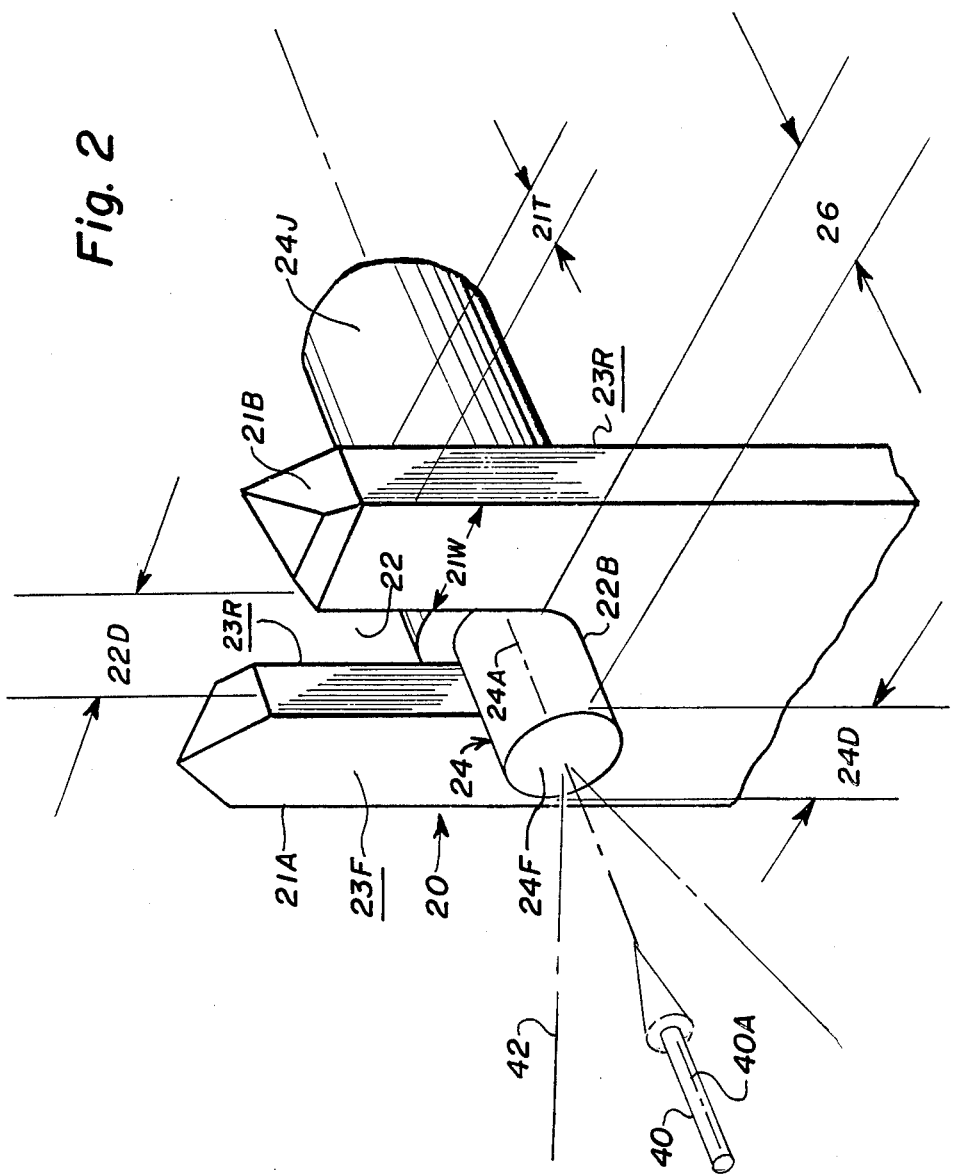

LASER WELDING METHOD

BACKGROUND OF THE INVENTION

1. Field of the Invention

This invention relates to a method of laser welding a single strand or a multistrand metallic conductor wire to a fixture.

2. Description of the Prior Art

In order to insure electrical and mechanical continuity metallic electrical conductors are attached to a thermal fixture by a variety of known welding techniques.

U.S. Pat. Nos. 3,524,963 (Swengel); 3,539,762 and 3,656,092 (both to Swengel et al.) disclose arrangements for arc welding a single metallic electrical conductor or a group of conductors to a generally cylindrical fixture. The metallic conductor(s) is (are) introduced into the cylindrical fixture and circumferentially surrounded thereby. In practice, a welding electrode is brought to bear into direct physical contact against the facial end of the conductor. As the electrode is displaced in a direction substantially coaxially with the axis of the portion of the conductor received in the fixture an electrical discharge is created between the electrode and the fixture whereby the same are fused together. The welding electrode may also be displaced in a direction approximately forty-five degrees to the axis of the conductor to initiate the discharge.

Arc welding is believed disadvantageous because of its practical requirement of direct physical contact between the electrode and the conductor being welded. This requirement is believed to contribute to inconsistencies in weld quality from weld to weld.

Other known welding techniques utilize a beam of welding energy, such as that produced by a laser of an electron beam source. The energy geam is directed toward the conductor wire and the terminal to form a molten pool of material. An example of this technique is disclosed in U.S. Pat. No. 3,610,874 (Gagliano). In this arrangement the beam of welding energy is directed primarily toward the terminal with a fringe of the beam being incident on the conductor wire. The beam is directed radially with resepct to the wire. The molten pool of material flows into the conductor/terminal interface. As the material cools the joint is formed therebetween.

This technique is believed disadvantageous due to the stringent control that must be exercised over the permissible magnitude range for the welding beam energy. The beam energy must be sufficient to melt the material of the terminal so it may form a pool which flows into the conductor/terminal interface. This threshold defines the lower limit of permissible beam energy. The upper limit of permissible beam energy must be less than that which would cause the conductor wire or the terminal to vaporize. It is recognized that the resultant weld joint should be stress relieved. Residual stresses could result in cracking of the joint.

An alternative laser welding technique is disclosed in copending application Ser. No. 4,197, filed Jan. 16, 1987, assigned to the assignee of the present invention. This application discloses an arrangement wherein the beam of welding energy is directed toward the terminal, whick generally overlies the conductor wire. The beam is directed radially of the conductor. A portion of the molten pool is unconstrained and is thus free to shrink as it solidifies without cracks being formed. Since the terminal shields the conductor wire the magnitude of lower energy level of the range of permissible beam welding energies is relatively high as compared to the method last discussed. This is due to the fact that it is necessary to melt completely through the terminal and partially through the conductor before the molten pool of material is formed. Also, the presence of the conductor beneath the terminal is believed to act as a heat sink. The upper limit of the range of permissible energies must be controlled to prevent the conductor from being vaporized.

U.S. Pat. No. 4,252,397 (Eigenbrode et al.), assigned to the assignee of the present invention, discloses another laser welding technique. In accordance with this patent an interconnection is formed using laser welding between a metallic conductor wire, in either single strand or multiple strand form, and a fixture in the form of the tines of an IDC (insulation displacement contact) terminal. The tines of such a terminal form a substantially open-mouthed, generally U-shaped slot. In accordance with the disclosure of this patent the insulation of the cable is removed and the metallic conductor wire strand or strands, as the case may be, are bent upon themselves to form a bight which loops over the insulation displacement contact terminal. FIG. 1 shows the resultant orientation of the metallic conductor wire (shown only as a single strand) and the terminal. Thereafter, the metallic conductor wire is rigidly attached to the terminal by directing a beam of laser energy from a position axially forward of the terminal toward the tips of the tines. A molten pool of material from the tines flows onto the conductor to form the joint.

Since the beam of welding energy is directed toward the surfaces of the tines of the fixture relatively close control must also be exercised over the magnitude of the energy beam. The patent is explicit in its teaching that laser welding energy must be maintained between ten and fifteen joules in order to form a weld without vaporizing the tines of the metallic fixture.

Accordingly, in view of the foregoing, it is believed advantageous to provide an arrangement for rigidly interconnecting, preferably by laser welding, the metallic conductor wire (in either single strand or multiple strand form) to a suitable fixture which requires less stringent control over the range of permissible welding energies.

SUMMARY OF THE INVENTION

The present invention relates to a method for laser welding a metallic conductor wire in either single or multiple strand form to a metallic fixture and to a finished terminal-conductor arrangement. In accordance with this invention the metallic conductor wire is positioned within the metallic fixture which receives the same such that the axis of the portion of the wire in the fixture immediately rearwardly of the facial end thereof extends in a substantially linear fashion from the forward to the rear surfaces of the fixture. Preferably the wire is received in the fixture such that at least substantially one hundred eighty degrees of the wire is in contact with the fixture. Thereafter, a welding energy from a source spaced from the wire, as a laser, is directed toward the facial end of the wire. Preferably the axis of the beam lies substantially parallel to the axis of the portion of the wire within the fixture. The resulting structure takes the form of a bead, or nugget, of conductor wire fused to some depth with the material of the fixture. In the preferred case the fixture takes the form of a pair of tines which cooperate to define an open-mouthed U-shaped slot. The conductor wire is preferably seated into the bottom of the slot.

BRIEF DESCRIPTION OF THE DRAWINGS

The invention will be more fully understood from the following detailed description thereof taken in connection with the accompanying drawings which form a part of this application and in which:

FIG. 2 is a side perspective view of a metallic conductor wire received within the preferred form of terminal fixture in accordance with the method of the present invention wherein the wire is bottomed against the fixture;

DETAILED DESCRIPTION OF THE INVENTION

Figure 1:
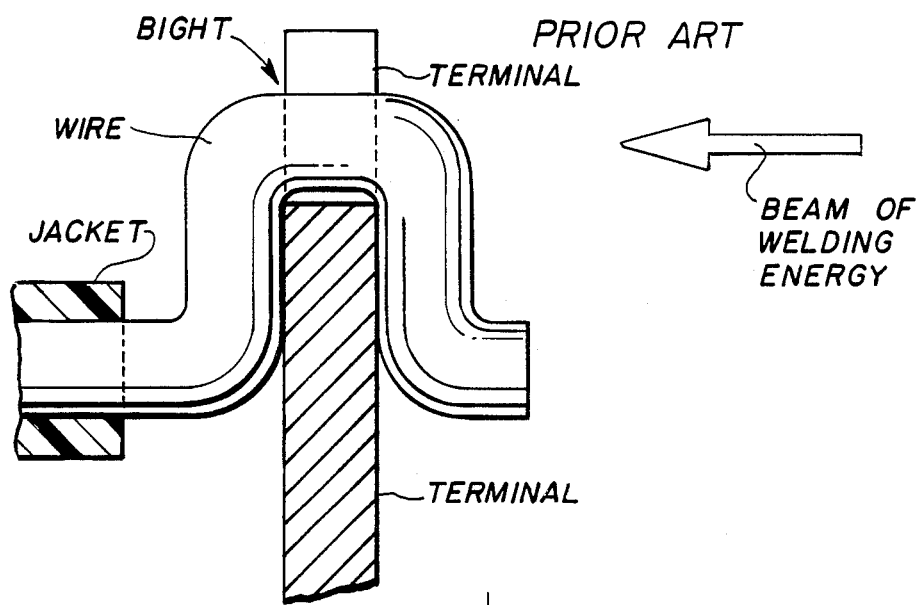
FIG. 1 is a side elevational view illustrating the relationship of a metallic conductor wire and an insulation displacement contact terminal in accordance with the arrangement described in U.S. Pat. No. 4,252,397.

Throughout the following detailed description, similar reference numerals refer to similar elements in all figures of the drawings.

With reference now to FIG. 2 shown is a side perspective view of the relationship between a metallic terminal fixture generally indicated by reference character 20 having an opening therein and a metallic conductor wire 24 preparatory to the welding of the wire 24 to the fixture 20 in accordance with the method of the present invention.

As used herein it should be understood that the term "wire" is meant to denote either a single strand or multiple strands of conductive material. It should also be understood that the teachings of the present invention have utility in welding each of the plurality of metallic conductor wires (each being either single or multistranded) of a multiple wire cable to a corresponding metallic fixture. As is seen from FIGS. 2 through 5 the preferred form of fixture 20 includes a pair of tines 21A, 21B cooperating to define an opening in the form of an open mouth slot 22 therebetween. The slot 22 has a bottom 22B thereon. The slot 22 may assume any convenient configuration, e.g., U-shaped, V-shaped, channel-shaped. The U-shaped slot is herein preferred because it more closely conforms to the shape of the wire and thus increases the contact area therebetween. Each of the tines 21A, 21B has a forward surface 23F and a rear surface 23R thereon.

Figure 6:
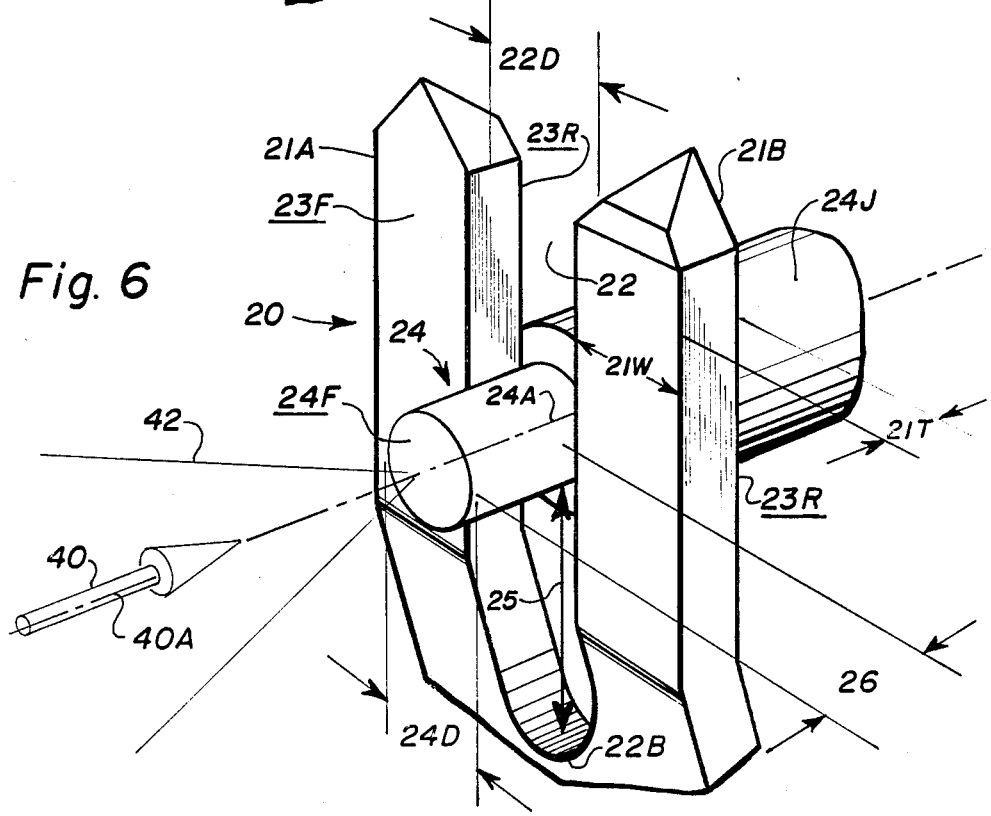
FIG. 6 is a side perspective view generally similar to FIG. 2 illustrating the conductor wire as received at a location spaced from the bottom of the slot of the fixture.

The metallic conductor wire 24 (shown in the drawings as a single strand) is stripped of its insulating jacket 24J a predetermined distance from the facial end surface 24F. The wire 24 is preferably 26 AWG. The wire 24 is laid into the slot 22 in the terminal fixture 20. The wire 24 is located in the slot 22 so that, in the preferred case illustrated in FIGS. 2 through 5, the wire 24 seats against the bottom 22B of the slot 22. That is to say, the wire is "bottomed" or in contact over at least approximately one hundred eighty degrees of the circumference thereof with the material of the fixture. It should be understood, however, that the wire 24 may be spaced some predetermined distance 25 above the bottom 22B of the slot 22, as is illustrated in FIG. 6. In the preferred embodiment the dimension 22D of the slot 22 between the tines 21A, 21B of the fixture 20 is equal to or slightly less than the diameter 24D of the conductor wire 24 so that the wire 24 is accepted within the slot 22 with a slight interference fit. This arrangement is preferred for its ease of assembly. It should be noted that if the preferred fixture is used the tines 21A, 21B should not bite into the wire, as this could cause a neck-down of the wire, with a concomitant loss of strength. The tines 21A, 21B each have a width 21W at least as wide as the wire diameter 24D. As will be developed this dimension serves to provide a uniform mass for welding. Changes in this dimension results in changes in the upper limit of welding energy. Narrower tines (i.e., having a lesser dimension 21W) are subject to melting before the wire 24, thus creating variations in joint consistency. The tines 21A, 21B also have a thickness dimension 21T associated therewith.

Figure 7:
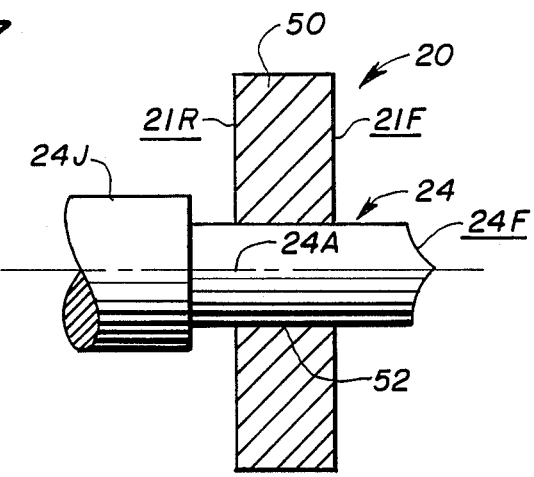
FIGS. 7 and 8 are, respectively, a side sectional views of alternate fixtures with which the present invention may be used.
Figure 8:
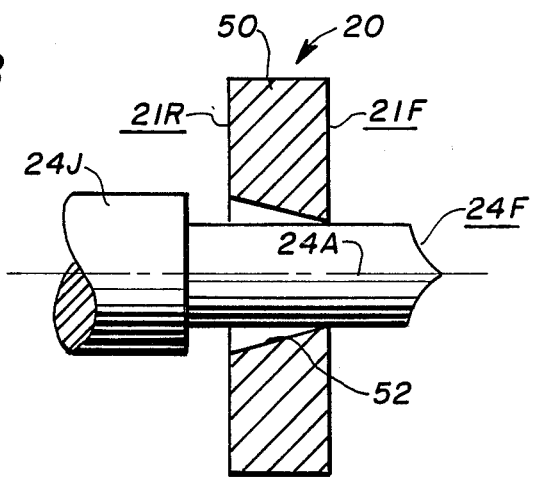

In accordance with the present invention the geometric relationship defined between the wire 24 and the fixture 20 as the wire 24 is received within the terminal fixture 20 is such that the wire 24 extends in a substantially linear fashion through the gap 22 from the forward surface 23F to the rear surface 23R of the tines thereof. That is to say, the axis 24A of the portion of the wire 24 within the fixture 20 does not define a bight as in the case of the system disclosed in U.S. Pat. No. 4,252,397 (as shown in FIG. 1) but instead the axis 24A of the portion of the wire immediately rearwardly of the facial end 24F thereof extends linearly through the slot 22 from the forward to the rear surface of the fixture. The portion of the wire 24 adjacent the facial end 24F thereof may be flush with the surface 21F or may overhang past the forward surface 21F of the fixture 20 by a predetermined distance 26. Preferably, the overhang distance 26 is a length not exceeding three times the diameter 24D of the wire 24. It should be noted that although the facial end 24F of the wire 24 is shown in most of the Figures as substantially planar for clarity of illustration, in practice the facial end 24F may be bicuspid in form (or otherwise configured) owing to the nature of the implement used to sever the wire. The bicuspid configuration is illustrated in FIGS. 7 and 8.

Figure 3:
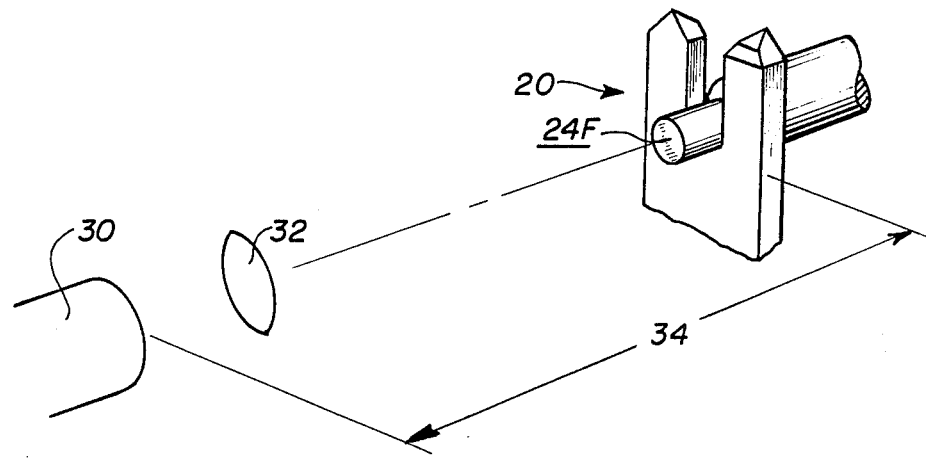
FIG. 3 is a perspective view of the conductor/terminal shown in FIG. 2 illustrating the relationship thereof with a source of laser welding energy and associated beam-forming optics.

As is best seen in FIG. 3 a source 30 of welding energy, such as a pulsed Nd:YAG laser, is spaced from the fixture 20. Appropriate beam forming and targeting optics 32, such as a fused quartz lens, is interposed between the fixture 20 and the source 30. The lens 32 lies a predetermined distance 34 from the face 21F of the fixture 20. The distance 34 is approximately equal to the focal length of the lens 32. The lens 32 serves to shape the beam 40 of laser energy directed toward the fixture 20 and the conductor 24 therein. The beam 40 of laser energy is constricted by the action of the lens 32 to form a relatively narrow focal region 32F in the vicinity of the surface 21F of the fixture 20. It should be appreciated that other laser sources may be used. It also lies within he contemplation of this invention to use an electron beam source and associated beam forming and targeting yokes to form the beam 40 of welding energy. If the mentioned laser source is used a total pulse width on the order of three (3.0) milliseconds is preferred. As noted the focal region 32F of the beam is incident substantially at the forward surface 21F of the fixture 20.

Figure 4:
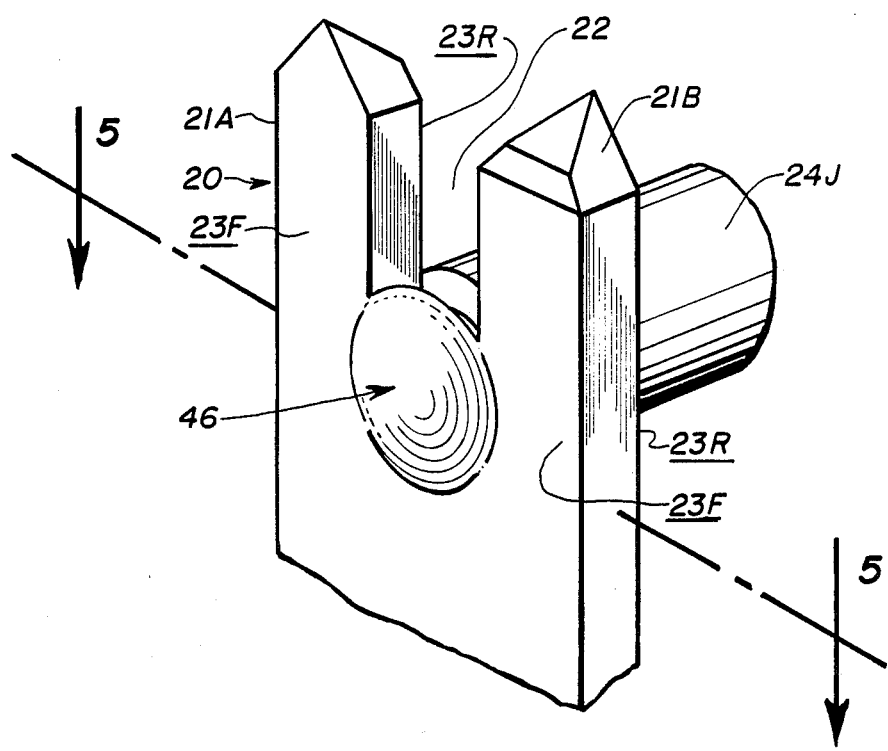
FIG. 4 is a view similar to FIG. 2 showing a metallic conductor wire welded to a metallic fixture in accordance with the method of the present invention.

As seen in FIGS. 3 and 4 the beam 40 of welding energy, preferably a laser welding beam, is in the preferred case targeted on the facial end 24F of the wire 24. In the preferred instance the laser welding beam 40 is directed toward the facial end 24F of the wire 24 such that the axis 40A of the welding beam 40 is substantially colinear to the axis 24A of that portion of the wire 24 immediately rearwardly of the facial end 24F thereof received within the fixture 20. However, it lies within the contemplation of this invention that the axis 40A of the welding beam 40 may lie above or below the axis 24A of the wire or directed toward the axis 24A from anywhere within the solid cone 42 centered on the axis 24A of the wire 24. The target of the beam should be located, in the preferred case, within one wire diameter from the axis 24A of the wire 24. That is to say, the focal region 32 of the beam should have a dimension on the same order as the dimension of the diameter 24D of the wire so that the laser beam, if targeted within a distance of one diameter of the axis 24A of the wire 24 will fall incident on the facial end 24F of the wire 24.

Figure 5:
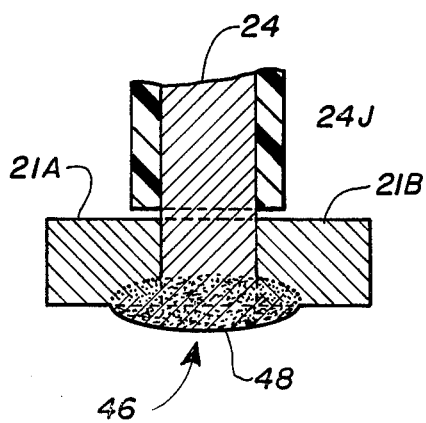
FIG. 5 is a section view taken along section lines 5—5 of FIG. 4.

As a result, as shown in FIGS. 4 and 5, after the application of welding energy a bead or nugged 46 of the material of the conductor 24 is formed adjacent the forward surface 21F of the fixture 20. The material of the conductor wire 24 fuses with the material of the fixture 20, as illustrated in the stippled region 48 in FIG. 5.

Figure 9:
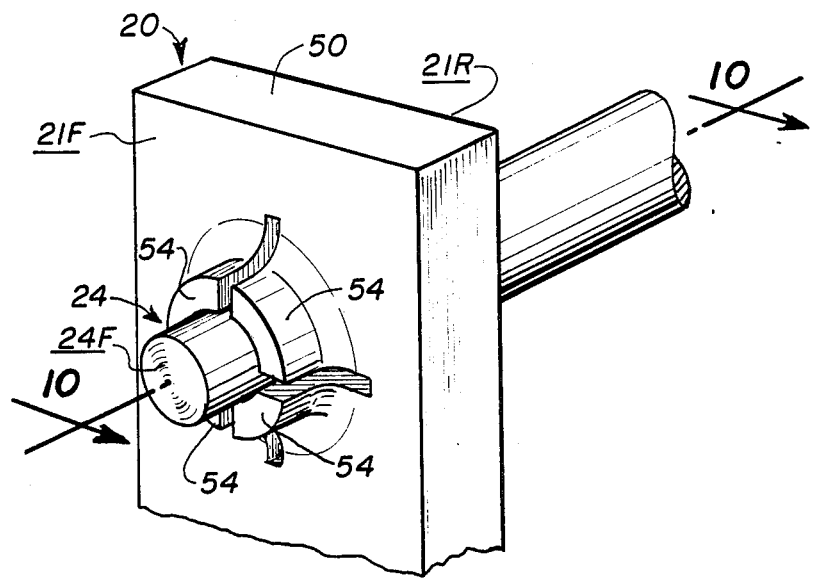
FIG. 9 is a perspective view of yet another alternate fixture with which the present invention may be used.
Figure 10:
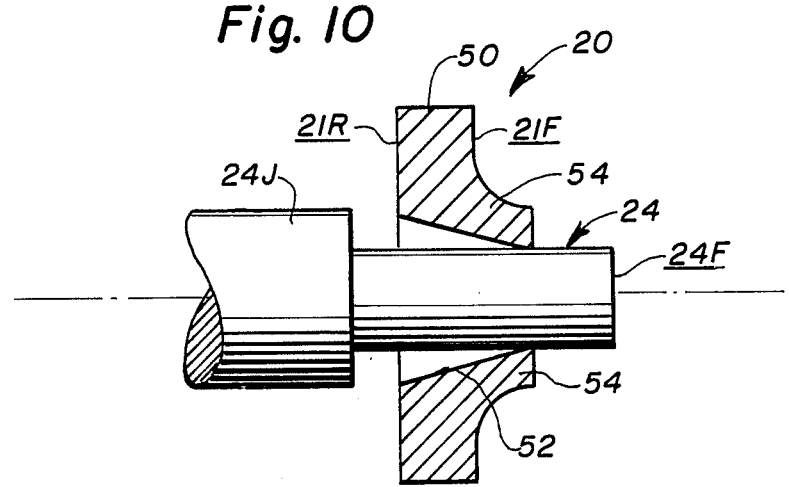
FIG. 10 is a side elevation view taken along section lines 10—10 in FIG. 9.

FIGS. 7, 8 and 9, 10 illustrate alternate forms of fixtures 20 with which the invention may be used. As seen in FIGS. 7 and 8 the fixture 20 may be in the form of a plate 50 having an opening defined by a through bore 52 therein. The bore 52 may be straight or inclined, as illustrated in FIG. 8. When inclined the bore tapers from a wider dimension at the rear surface 21R toward the front surface 21F thereof. As seen in FIGS. 9 and 10 the fixture 20 may be provided with a bore 52 that is compliant due to the presence of the flanges 54 about the bore 52. In each instance the same geometric relationship between the wire 24 and the fixture 20 is defined. Similarly, the same beam target is used. Since the alternate form of fixtures do not permit latitude in spacing the wire from the "bottom" of the opening in the fixture, the preferred wire location (i.e., bottomed in the fixture) obtains as with the preferred form of fixture, FIGS. 2 through 5.

Figure 11:
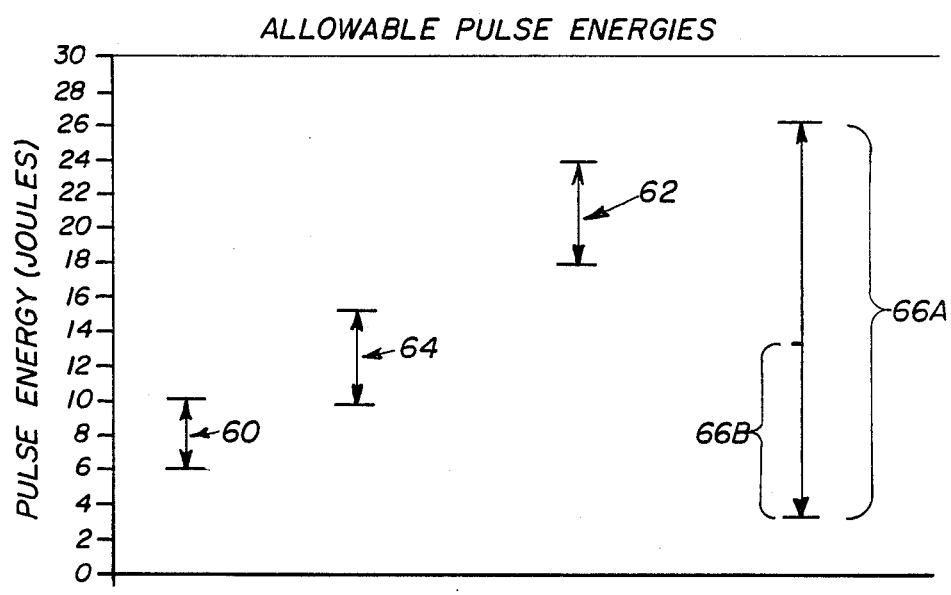
FIG. 11 is a graphical comparison of the qualitative differences for the spans of permissible energies for various welding arrangements, including that in accordance with the present invention.

The difference in the ranges and magnitudes of permissible welding energies using the teachings of the present invention is perhaps best illustrated in connection with the graphical depiction shown in FIG. 8. In this Figure the ranges and magnitudes for various welding arrangements known in the art are illustrated. The graphical depiction in FIG. 11 is meant to illustrate that each of the above-discussed beam welding methodologies discussed in the Background portion hereof results in a relatively narrow span of permissible beam energies whereas the method of the present invention qualitatively results in a significantly larger span of permissible energies. As a result, using the facial welding process of the present invention, less stringent control need be exercised over the energy of the beam of welding energy. The greater span of permissible welding energies is the direct result of: (1) the geometric relationship of the wire and the fixture, (2) the location of the beam target on the facial end of the wire and (3) the location of the wire within the fixture (bottomed). In the graphical depiction of FIG. 11 small variations exist in wire diameter, fixture material and fixture thickness for the methods discussed at 62, 64 and 66A, 66B. It is believed that these variations cause small but insignificant differences but do not alter the qualitative results shown.

If the arrangement generally similar to that shown in U.S. Pat. No. 3,610,874 (Gagliano) is used both the absolute magnitudes of permissible welding energies and the range, or "span", of permissible energies is believed to be relatively low, as shown at reference character 60 in FIG. 11. This is imposed by the fact that sufficient energy to melt the material of the terminal must be supplied before the molten pool is formed. However, as seen by the relatively low upper limit, the energy must not be sufficient to vaporize the terminal or the conductor wire. It is estimated that, based on the teachings of this patent, energies within the range of six to ten joules must be used for the preferred wire being welded by the other methodologies discussed herein (including that of the present invention).

In the arrangement such as described in the copending application Ser. No. 4,197 the absolute magnitudes of the welding energies is relatively higher, on the order of eighteen (lower limit) to twenty-four joules (upper limit), with the permissible span being about six joules. This is shown in the area of reference 62 in FIG. 11. The lower limit on the magnitude of the permissible energies stems from the fact that before welding can occur the terminal and a portion of the wire therebeneath must be melted. The upper limit is the energy which would vaporize the terminal and the wire.

In the arrangement shown by U.S. Pat. No. 4,252,397 (Eigenbrode), as illustrated at reference character 64 in FIG. 11, the span of permissible energies in about the same as that discussed for the other methodologies (on the order of five joules) permissible range lies generally between those of the other discussed techniques. The lower limit on the absolute magnitude of the beam is lower than the case of the above-referenced copending application owing to the fact that the heat sink effect provided by the wire is not present. The upper limit on the magnitude is approximately fifteen joules, since it is at this energy level that vaporization of the tines of the fixture would likely occur.

The range of permissible welding energies for the arrangement of the present invention is illustrated in FIG. 11 at reference character 66A. As may be seen both the magnitudes and the span of permissible energies for the system here considered is considerably greater than that of any other arrangement discussed herein. This span 66A applies for any of the fixtures herein described, so long as the preferred target location (facial) and the preferred location of the wire in the opening of the fixture (i.e., bottomed) are used. Effective welding occurs at a relatively low energy level, on the order of three joules, since it would be at this energy level that a melt zone would form so that the nugget 46 (FIG. 5) would include material at the surface of the tines. The upper limit of approximately twenty-six joules is explicable when one considers that an acceptable weld would occur as long as the melt zone results in a nugget 66 that includes some of the material from the rear surface 21R of the tine or tines of the fixture incorporated in the mass of the nugget. If the wire is bottomed in the fixture the material of the fixture adjacent the bottom of the opening therein assists in sinking the heat generated by the welding. However, it should be understood that even if the preferred (slotted) fixture is used with the wire located therein above the bottom 22B of the slot, and even with the same geometric relationship (linear through the fixture) and the same target location (facial) (FIG. 6) are used the span of permissible energies is somewhat constricted, as shown at 66B, but still relatively wide. The span in this instance is from approximately three to thirteen joules. It is expected that using fixtures as shown in FIGS. 7 through 10 the span of permissible energies would exceed the span 66. This increase would be expected because of the increased material mass surrounding the wire. In these instances sufficient overhang should be provided to form a convex nugget (FIG. 5).

As a result it may be appreciated that the welding method of the present invention defines a range of permissible energy levels that is relatively forgiving. The degree of care over the parameters of the welding process is thus relatively relaxed over the arrangements of the prior art. This translates, in a manufacturing arena, to a more reliable process and can lead to lower fabrication costs.

Those skilled in the art having the benefit of the teachings of the present invention may effect numerous modifications thereto. It is to be understood, however, that these modifications are within the contemplation of the present invention as defined in the appended claims.

What is claimed is:

1. A method for welding a metallic conductor wire into a metallic fixture, the fixture having an opening therein and a forward and rear surface thereon, the metallic conductor wire having an axis therethrough and a facial surface having a predetermined diameter at one end thereof, the method comprising the steps of:

introducing the wire into the opening of the fixture to bottom the wire with respect thereto, the wire being received within the fixture such that the axis of that portion of the wire extending immediately rearwardly from the facial end of the wire is supported within the fixture so as to extend in a substantially linear fashion from the forward to the rear surface of the fixture, and, directing a beam of welding enery toward the facial end of the wire, the beam of welding energy having an axis, the axis of the beam being substantially parallel to the axis of the portion of the wire in the fixture.

2. The method of claim 1 wherein the wire is introduced into the fixture such that a predetermined overhang portion of the wire extends forwardly of the forward surface of the fixture, the overhang distance being a distance less than three times the diameter of the wire.

3. The product produced by the process of claim 1.

4. The method of claim 2 wherein the fixture has a U-shaped slot therein.

5. The method of claim 2 wherein the fixture is a plate having a bore therein.

6. The method of claim 5 wherein the bore is tapered from the rear surface toward the front surface.

7. The method of claim 5 wherein the plate has flanges which define a compliant bore therein.

8. An electrical terminal comprising a fixture having a forward and a rear surface thereon, the fixture having an opening therein, an electrical conductor wire disposed in the fixture so that the wire is bottomed with respect to the opening therein, the conductor wire having an axis therethrough and a facial surface at one end thereof, the portion of the conductor wire extending rearwardly from the facial surface of the wire being disposed in a substantially linear fashion from the forward to the rear surface of the fixture, the conductor being welded to the fixture by a beam of welding energy the axis of which is substantially parallel to the portion of the wire in the fixture such that a portion of the material of the conductor wire forms a weld nugget which is fused to the material of the fixture.

9. The terminal of claim 8 wherein the fixture comprises a pair of tines with the conductor wire being disposed between the tines.

* * * * *